June 6, 1967 R. C. TALBOT 3,323,281
HANDLING APPARATUS FOR HINGED COVER CARTONS
Filed Dec. 14, 1964 5 Sheets-Sheet 2

INVENTOR
RICHARD C. TALBOT

BY

ATTORNEYS

June 6, 1967  R. C. TALBOT  3,323,281
HANDLING APPARATUS FOR HINGED COVER CARTONS
Filed Dec. 14, 1964  5 Sheets-Sheet 3

INVENTOR
RICHARD C. TALBOT
BY
ATTORNEYS

June 6, 1967 R. C. TALBOT 3,323,281
HANDLING APPARATUS FOR HINGED COVER CARTONS
Filed Dec. 14, 1964 5 Sheets-Sheet 4

FIG. 6

INVENTOR
RICHARD C. TALBOT
BY
ATTORNEYS

United States Patent Office 3,323,281
Patented June 6, 1967

3,323,281
HANDLING APPARATUS FOR HINGED COVER CARTONS
Richard C. Talbot, Skokie, Ill., assignor to Peters Machinery Company, Chicago, Ill., a corporation of Illinois
Filed Dec. 14, 1964, Ser. No. 418,245
19 Claims. (Cl. 53—250)

This invention relates to improvements in apparatus for loading cookies into cartons.

A principal object of the present invention is to provide an improved form of apparatus for supplying cartons for loading from the top thereof, arranged with a view toward utmost simplicity in construction and efficiency in loading.

Another object of the invention is to improve upon the apparatus heretofore in use for loading cookies, by dropping the cookies into cartons, by providing an improved supply means for the cartons together with a novel arrangement for retaining the cover and dust flaps of the cartons free from the cookies dropping into the cartons during the loading operation.

A still further object of the invention is to provide an improved form of apparatus for loading cartons having hinged covers and opposite hinged dust flaps by dropping cookies into the cartons through a drop chute, in which cartons are supplied to a pusher, pushing the cartons in registry with the drop chute, and in which a stop spaced in advance of the pusher moves therewith, to hold the cartons in registry with the drop chute during a carton loading operation.

Still another object of the invention is to provide a novel form of loading device for supplying cartons for loading and for loading cartons, while held stationary on a continuously traveling conveyor, in which the cartons are supplied under a drop chute disposed above the conveyor, and in which a stop movable in advance of the carton supply means retains the cartons from movement with the conveyor under the drop chute and is spaced from the drop chute a distance sufficient to accommodate the hinged cover to extend upwardly along the outside of the drop chute.

These and other objects of the invention will appear from time to time as the following specification proceeds and with reference to the accompanying drawings wherein:

In the embodiment of the invention illustrated in the drawings, I have shown a delivery conveyor 10 of a carton loader 11 with a pusher 12 movable transversely of the conveyor 10 for successively supplying cartons to a drop chute 15 of the carton loader and for the retaining of the cartons in position on the traveling conveyor beneath the drop chute during the loading operation by a stop 13, releasing the cartons at the termination of a loading operation, to be delivered for closing.

The carton loader operates on principles similar to the tray loader shown and described in an application Ser. No. 345,902 filed by me on Feb. 19, 1964 and entitled "Tray Loader." The details of the loader, therefor, need not herein be shown or described.

Figure 4:
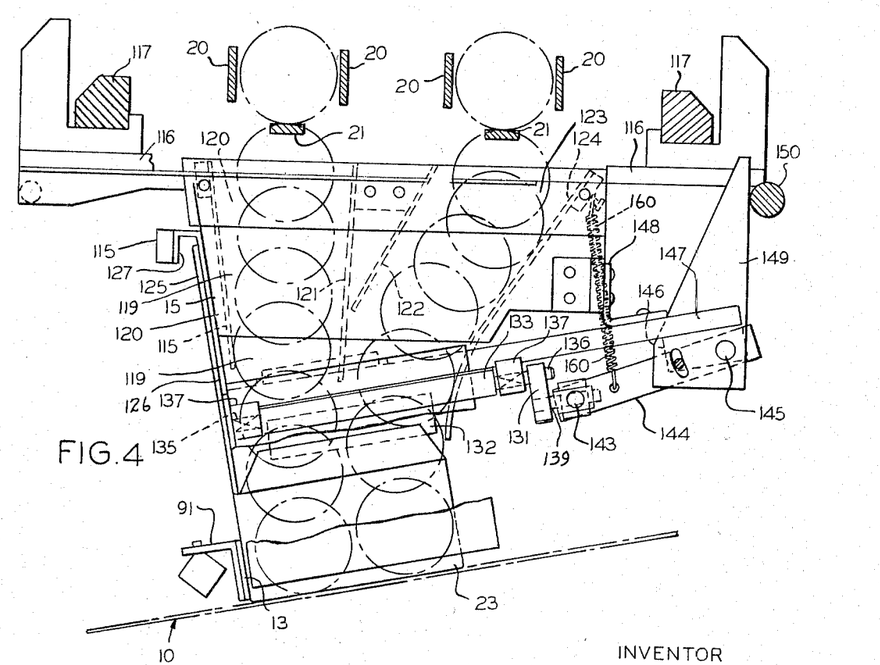
FIGURE 4 is a fragmentary view in side elevation of a carton loading device with certain parts broken away and certain other parts shown in section taken longitudinally of the carton delivery conveyor.
Figure 5:
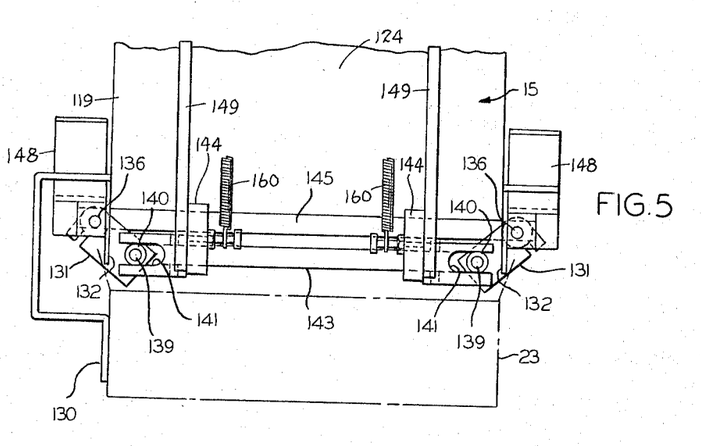
FIGURE 5 is a fragmentary rear end view of the drop chute, guiding rows of cookies to a carton, and showing certain details of the retainers for retaining the dust flaps out of the paths of the dropping cookies.
Figure 6:
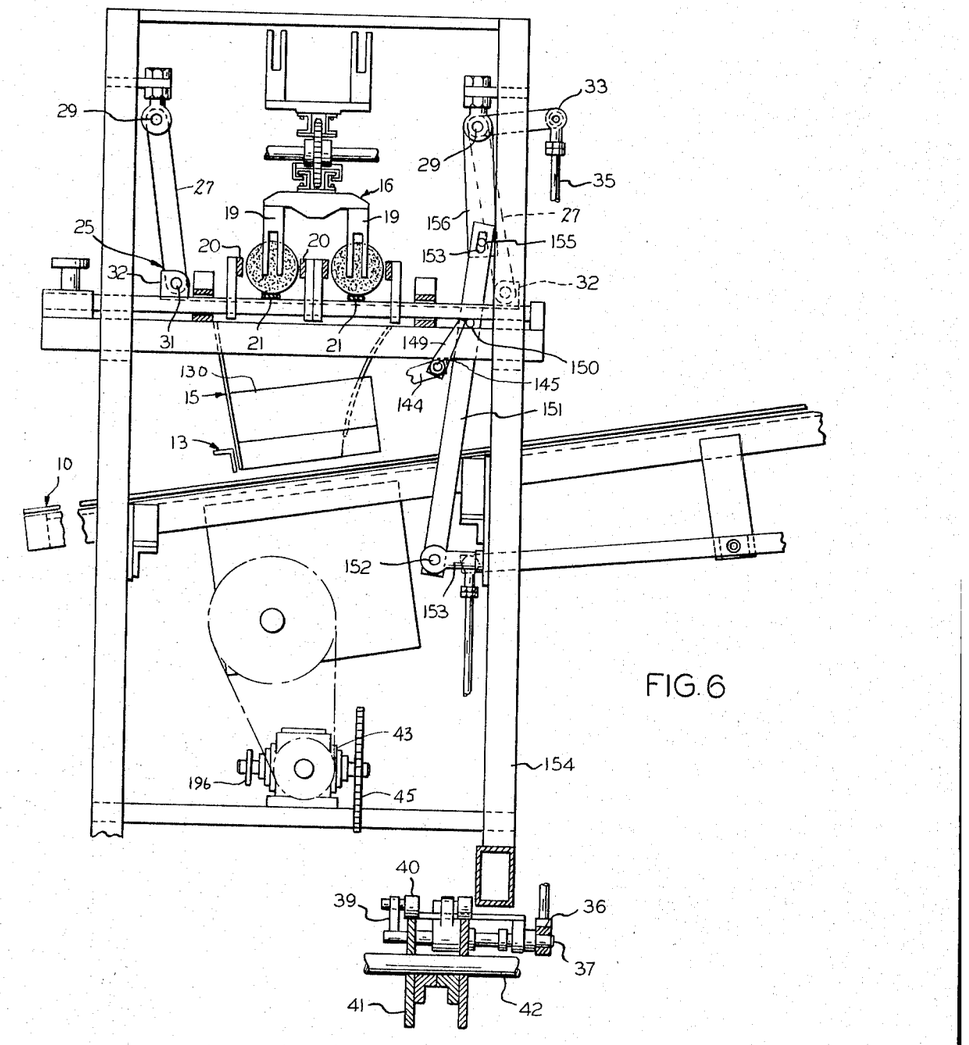
FIGURE 6 is a fragmentary longitudinal sectional view showing certain details of the means for conveying the cookies for loading and dropping the cookies through the drop chute.
Figure 7:
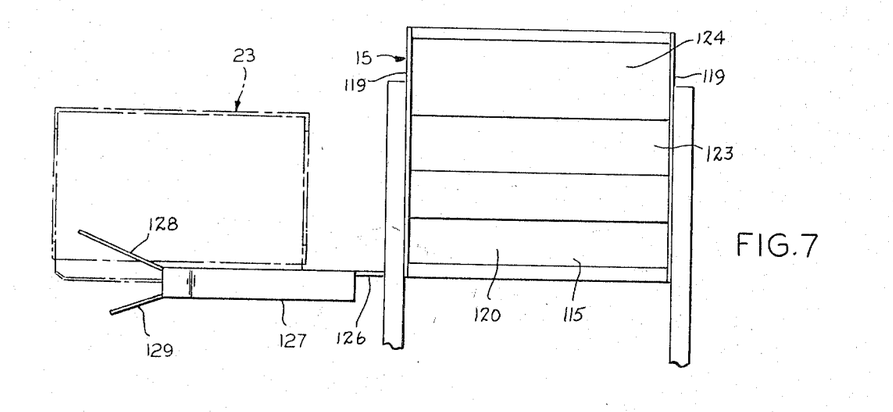
FIGURE 7 is a fragmentary plan view of the drop chute and guide.

The carton loader as shown in FIGURES 4, 5 and 6, supplies counted rows of cookies from a counting conveyor (not shown) to a transfer conveyor 16 disposed above the delivery conveyor 10 and movable transversely thereof. The transfer conveyor 16 generally includes an endless chain 17 having spaced flights or attachments 18 secured thereto. Each attachment 18 has a pair of spaced conveying fingers 19, 19 extending downwardly between guide plates 20, 20 for conveying the rows of cookies along drop gates 21, 21 forming the material carrying surfaces of the conveyor, and movable laterally to drop the rows of counted cookies into the drop chute 15, to be loaded into a carton 23.

The transfer conveyor 16 is intermittently driven with a dwell during the dropping of cookies into the drop chute 15, during each operation of loading cookies into the carton 23, as shown and described in my application Ser. No. 345,902 and no part of the present invention so not herein shown or described further.

The drop gates 21, 21 are a part of a laterally movable drop gate carriage 25, suspended from rock shafts 29, 29 on parallel links 27, 27. The shafts 29, 29 are journalled in aligned bearing supports 26, 26. The parallel links have shafts 31 mounted on their lower ends and mounted on support brackets 32 supporting the carriage 25 on the shafts 31 and links 27, 27.

The drop gate carriage 25 is moved back and forth in timed relation with respect to travel of the transfer conveyor 16, to drop two rows of uniform groups of cookies through the drop chute 15 into a carton 23 by rocking movement of a lever arm 33 secured to and extending outwardly of one shaft 29. A link 35 is pivotally connected to the outer end of the lever arm 33 and depends therefrom and is pivotally connected at its lower end to a lever arm 366 on a rock shaft 37. The rock shaft 37 has an arm 39 secured thereto and extending therefrom having a follower 40 on its end, engageable with a cam 41 on a cam shaft 42. The profile of the cam 41 is such as to move the drop gates 21 to release groups of cookies or sandwiches, to the drop chute 15 to be loaded into cartons 23, as the cartons are moved in cookie receiving relation with respect to the drop chute 15, during a dwell in travel of the transfer conveyor 16.

Figure 1:
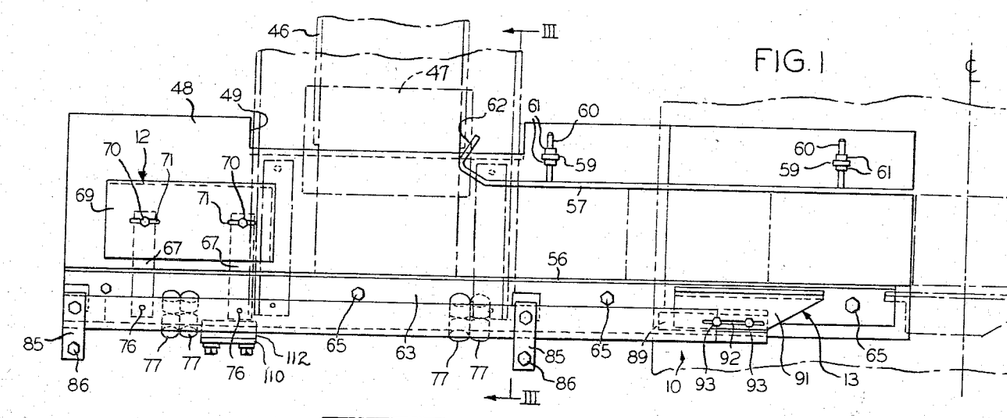
FIGURE 1 is a fragmentary plan view of a carton supply and stop means constructed in accordance with the principles of the present invention, illustrating the supply of cartons to a carton delivery conveyor in position to be loaded with cookies and the like, with the carton loading apparatus broken away.
Figure 2:
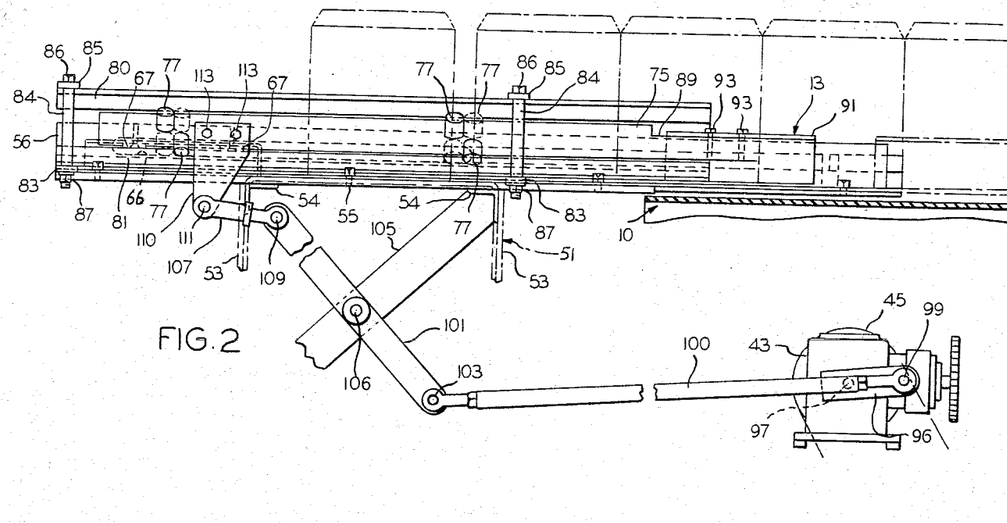
FIGURE 2 is a fragmentary view in side elevation of the carton supply and stop means shown in FIGURE 1.

The cam shaft 42 is suitably driven from a motor (not shown) and serves as a drive shaft for gearing (not shown) in a gear box 43 through a chain and sprocket drive 45 (FIGURE 2). The gear box 43 has right angled drive gearing therein, which may be conventional worm and worm gearing and serves as a drive member for the conveyor 10, and for a supply conveyor 46 disposed to one side of said conveyor and supplying cartons to the pusher 12.

Figure 3:
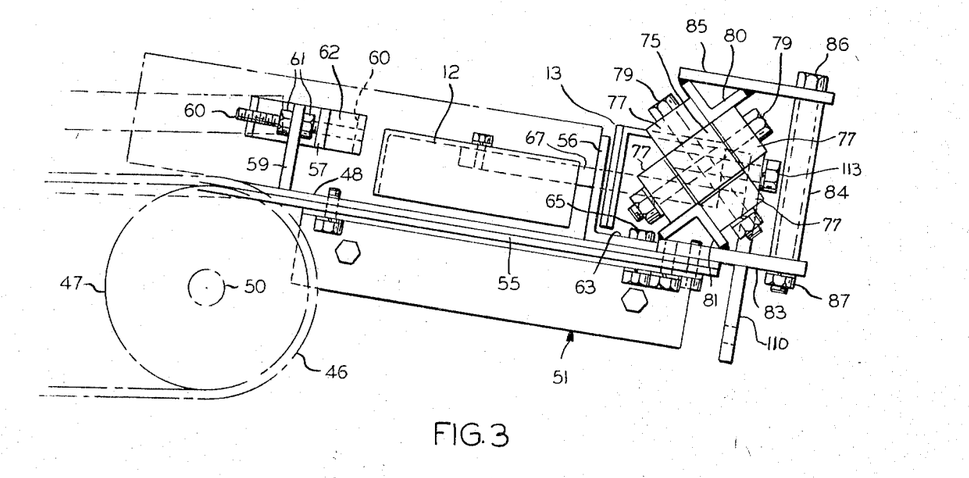
FIGURE 3 is a fragmentary end view of the carton supply and stop means shown in FIGURES 1 and 2.

The carton supply conveyor 46 may be a canvas belt conveyor and is shown in FIGURE 3 as traveling in a generally horizontal plane and turning about a drive pulley 47, disposed beneath a transfer table or plate 48 and partially recessing the material run of the conveyor in a rearwardly facing notch 49 in said transfer plate. The transfer table 48 thus forms a continuation of the material carrying run of the conveyor 46 as the conveyor turns about the drive pulley 47. The drive pulley 47 is mounted on a shaft 50 suitably journalled in a supporting frame structure 51 for the transfer table 48, pusher 12 and stop 13. The shaft 50 forms a drive member for the pulley 47 and may be driven from the delivery conveyor 10 in a conventional manner, and no part of the present invention so not herein shown or described further.

The frame structure 51 includes spaced legs 53 with angle irons 54 connecting said legs together and forming a support for a mounting plate 55 for the transfer table 48, supporting the transfer table 48 to extend in the plane of the delivery conveyor 10, over and along said delivery conveyor to a position adjacent the drop chute 15.

The transfer table 48 has a guide 56 extending along the lower or forward side thereof for substantially the length of said transfer table. The guide 56 forms a retainer for cartons delivered by the supply conveyor 46 and retains the cartons to said transfer table and to the conveyor 46 to be pushed by the pusher 12 along the transfer table onto the conveyor 10. Spaced upwardly of the guide 56 and extending along the transfer table 48 from the conveyor 46 to the end of said transfer table which overlaps the conveyor 10, is a guide strip 57. The guide strip 57 is spaced rearwardly of the guide 56, substantially the width of the carton to retain the cartons in alignment, as supplied by the pusher 12 for loading. The guide strip 57 is spaced above the table 48 and is mounted thereon on spaced upright brackets 59 welded or otherwise secured to the plate 48 and extending upwardly therefrom. Threaded rods 60 are welded or otherwise secured to the inner side of the guide 57 and extend through the support brackets 59 and are held in position on said support brackets as by lock nuts 61, 61 to support the guide 57 to extend along the table 48. The entering end of the guide 57 is turned angularly rearwardly toward the conveyor 46 and then backwardly beyond one side of said conveyor as indicated by reference character 62 to deflect the cartons discharged from the supply conveyor 46 to move downwardly along the transfer table 48 into engagement with the guide 56.

The guide 56 is shown as being the vertical leg of an angle iron, a horizontal leg 63, of which extends along the top surface of the table and is secured thereto as by machine screws 65.

The vertical leg of the angle iron forming the guide 56 has a slot 66 extending therealong, through which slidably extend spaced support arms 67 for the pusher 12. The arms 67 are shown as extending under a top plate 67 of the pusher and as being secured thereto by machine screws 70 extending through slots 71 in said top plate. The outer or forward ends of the arms 67, 67 extend within recessed portions 73, 73 of a drive bar 75 and are suitably secured thereto as by machine screws 76 threaded in said drive bar.

The drive bar 75 is shown as being square in cross section and turned at an angle of 45° with respect to the vertical. Groups of spaced rollers 77 are mounted on each face of the drive bar 75 as by bolts 79 extending through said drive bar. The upper and lower rollers 77 are guided for movement along the transfer table 48, parallel to the guide 56 on the outer faces of the legs of vertically spaced aligned upper and lower rails or guide tracks 80 and 81 in the form of angle irons. The rail 81 is welded or otherwise secured at the ends of its legs to spaced bars 83 welded or otherwise secured to the top surface of the transfer table 48 and extending forwardly therefrom. The bars 83 have spacer sleeves 84 extending upwardly from the top surfaces thereof. The sleeves 84 space bars 85, forming supports for the top rail 80, supporting said top rail in position to be engaged by diagonally opposite rollers 77. A bolt 86 extends through the bar 85 and sleeve 84 and has a nut 87 threaded on its lower end to retain the bar 85 in position.

The drive bar 75 has a flattened forward end portion 89, forming a support for a horizontal leg 91 of the stop 13. The leg 91 has a slot 92 extending therealong through which extend machine screws 83, 83 threaded in the bar 75 and retaining the stop 13 in the required position to move beyond the inner end of the transfer table 48 and accommodate a carton 23 to be moved downwardly by the conveyor into engagement with said stop and retain the carton in position for loading. The spacing between said stop and the inner guide face of the guide 56 is sufficient to accommodate the hinged cover of the carton to pass along a forward wall 115 of the drop chute.

The stop 13 and pusher 12 are reciprocably moved along the transfer table 48 by a crank 96 on a shaft 97 journalled in the gear housing 43 and driven from the chain and sprocket drive 45. The crank 96 has a crank pin 99 on its outer end pivotally connected with a connecting link 100, pivotally connected to a lower end of a rock arm 101 on a pivot pin 103. The rock arm 101 is pivotally mounted intermediate its ends on a bracket 105 on a pivot pin 106. The bracket 105 extends diagonally between the legs 53, 53 of the plate 55. The opposite end of the rock arm 101 is pivotally connected to a link 107 by a pivot pin 109. The link 107 in turn is pivoted to the lower end portion of a depending drive arm 110 on a pivot pin 111. The drive arm 110 is spaced from the drive bar 75 at its upper end, by a spacer 112, recessed within the drive bar 75 and extending outwardly therefrom. Machine screws 113 passing through said drive arm and spacer are threaded within the drive bar 75 to effect reciprocable movement of the pusher 12 and stop 13 upon rotation of a crank 96 in timed relation with respect to lateral movement of the drop gates 21. The cartons 23 supplied by the conveyor 46 may thus be successively fed to the drop chute 15 into cookie receiving relation with respect to said drop chute, and may be retained in this position on the traveling conveyor 10, with the cover thereof extending along the outside of the drop chute, by the stop 13, releasing the cartons to travel along the conveyor when loaded.

Referring now in particular to the drop chute 15, the guide guiding the carton cover to pass along the outside of a front wall 115 of the drop chute and the retainers for retaining the dust flaps of the carton out of the path of the cookies discharged thereinto through the drop chute, the drop chute 15 is mounted in cookie receiving relation with respect to the drop gates 21 on spaced supports 116 extending longitudinally of the conveyor 10 and suitably mounted on parallel transverse bars 117, extending transversely of the conveyor 10, as in my application Ser. No. 345,902 and no part of the present invention so not herein shown or described further.

The front wall 115 of the drop chute extends between side plates 119, and an inner surface thereof forms a front wall of a chute 120, guiding the rows of cookies for discharge into the carton 23. The rear wall of the chute 120 is formed by an intermediate wall 121 between the side plates 119. The front wall 115 and intermediate wall 121 are inclined to extend generally perpendicular to the plane of the conveyor 10 and are spaced apart distances slightly greater than the diameter of a cookie, dropping along the chute formed by said walls, to guide the cookies to drop straight down into the carton 23.

A rear cookie discharge chute is formed by a spacer 122 extending downwardly and angularly forwardly to the intermediate wall 121 and with said intermediate wall forming a front wall of a rear chute 123. A back wall 124 of the rear chute 124 leads angularly downwardly and forwardly between the side plates 118 to guide a rearwardly spaced row of cookies to drop into the carton 23, just behind the row of cookies dropping into the carton through the front chute 120.

Figure 8:
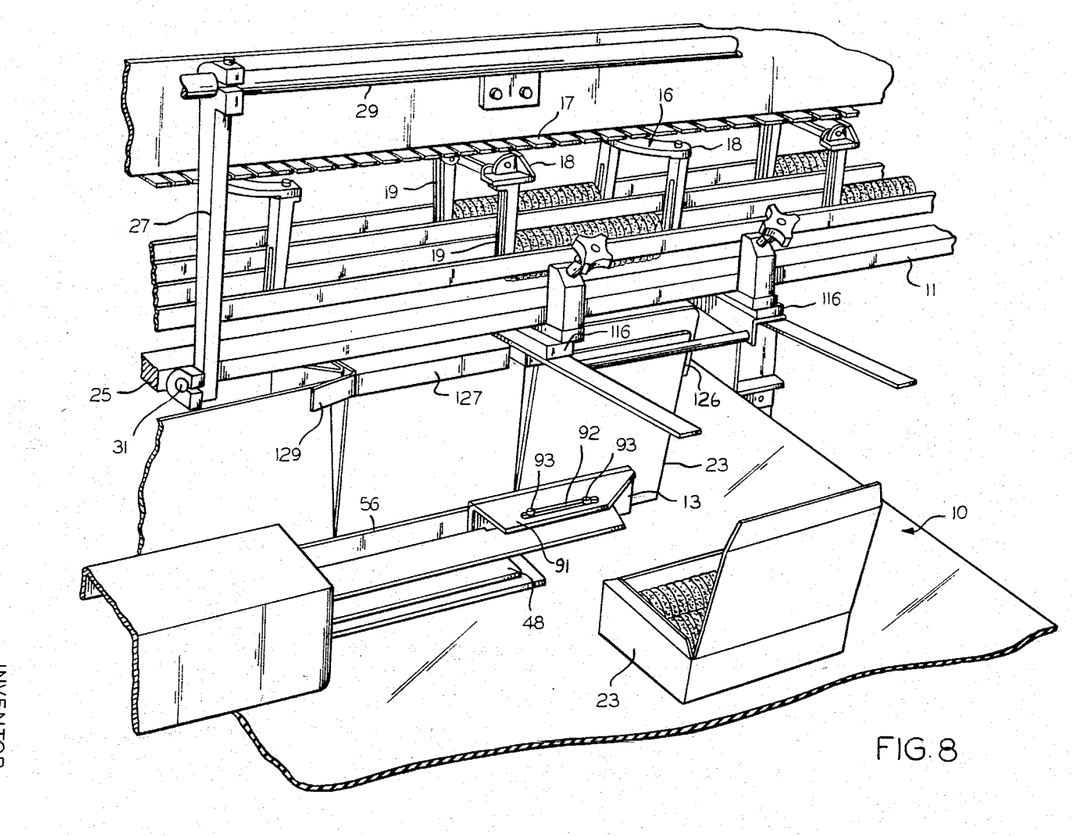
FIGURE 8 is a fragmentary perspective view of the loader.

A guide plate 126 extends along the front of the drop chute and is welded or otherwise secured to the forward ends of the side plates 119. The guide plate 126, as shown in FIGURE 8, extends from the side plate 119 adjacent the transfer table or plate 48 along the guide 56 in vertically spaced relation with respect thereto and has an inwardly turned advance end 128 engaging the upwardly extending hinged covers of the cartons as supplied to the drop chute 15 and guiding the covers to pass along the outside of said guide plate 126 and drop chute 15, to prevent the cover from interfering with the dropping cookies. The guide plate 125 has a downwardly opening channeled guide 127 extending outwardly therefrom from the drop chute toward the flared advance end 128, to form a guide for the top of the hinged cover. The downwardly opening channel guide 127 has a forward wall having an outwardly flared advance end 129 cooperating with the advance end 126 of the guide plate 125, to assure that the cover passes along the outside of the guide plate 125 with no interference.

The opposite side plate 119 from the pusher 12 has a stop 130 secured thereto and depending therefrom to limit movement of the cartons along the conveyor 10 and beneath the drop chute 15 into a carton loading position.

The stop 130 is shown in FIGURE 5 as being secured to a side plate 119 of the drop chute 15 and as extending laterally therefrom in the plane of the conveyor 10 over an operating crank 131 for a dust flap retainer 132. The stop 130 then extends downward along the outside of the crank 131 in laterally spaced relation with respect thereto, and then extends inwardly and downwardly to limit travel of the carton beneath the drop chute 15 into a position to be loaded with rows of cookies, dropped by lateral movement of the drop gates 21, 21.

A dust flap retainer 132 is mounted on each side of the drop chute 15 and depends therefrom to come into engagement with the insides of the dust flaps and move the dust flaps of the carton 23 outwardly distances sufficient to prevent the flaps from interfering with the dropping of rows of cookies into the carton. As shown in FIGURES 4 and 5, each dust flap retainer 132 is secured to the inner side of a rectangular bar 133. The dust flap retainer 132 extends along said bar for a portion of the length thereof and depends therefrom into position to engage the inside of a dust flap, upon angular movement of said retainer outwardly with respect to the drop chute 15. The bar 133 is shown as having shafts 135 and 136 extending from opposite ends thereof and rockably journalled in bearing supports 137, 137. The shaft 136 extends rearwardly of its bearing support and has a crank arm 131 secured thereto. The crank arms 131 on the shafts 136 are shown as extending angularly inwardly and downwardly of said shafts and as having crank pins 139 extending therefrom toward the drop chute 15 and having rollers 140 journalled thereon and engageable within outwardly opening slots 141 in a drive bar 143. The drive bar 143 is shown in FIGURE 5 as being in the form of a shaft having the outwardly opening slots 141 at opposite ends thereof and having spaced lever arms 144, 144 mounted thereon. The lever arms 144 are mounted on a transverse rock shaft 145. The shaft 145 is spaced rearwardly of the drop chute 15 and is mounted at its opposite ends in bearing supports 146 depending from and supported on support rails 147 extending along opposite sides of the drop chute 15 and rearwardly therefrom. The rails 147 are suitably secured to the sides of said drop chute and are secured to the rear end portion of the drop chute 15 to extend rearwardly therefrom as by angle brackets 148. The shaft 145 has operator arms 149 freely mounted thereon and extending upwardly therefrom into position to be engaged by an operator rod 150 reciprocably movable toward and from the drop chute 15 in timed relation with respect to reciprocable movement of the drop gates 21, to bring the dust flap retainers 132 downwardly into engagement with the insides of the dust flaps, as a carton comes into engagement with the stop 130 and the drop gates 21 move laterally, to accommodate rows of cookies to drop into the carton.

The rod 150 extends transversely of the delivery conveyor 10 and is mounted at one end in a lever arm 151 intermediate the ends of said lever arm and at its opposite end in a similar lever arm (not shown). The lever arm 151 in turn is pivotally mounted on a transverse pivot pin 152 mounted in a bracket 153, secured to and extending inwardly of an upright frame member 154 of the supporting frame structure for the carton loader. The lever arm 151 extends above the rod 150 and has a slot 153 in its upper end portion engaged by a drive pin 155 mounted on a lever arm 156. The lever arm 156 is secured to the rock shaft 29 and rocked thereby, upon rocking movement of the lever arm 33.

Tension springs 160 are connected between the rear wall of the drop chute 15 adjacent the upper end thereof, and the lever arms 144, to bias the dust flap retainers 132 in their uppermost positions, and to bias the operator arms 149, 149 into engagement with the rod 150. An adjustable drive connection is provided between each operator arm 149 and lever arm 144, which is herein shown as being a machine screw 163 extending through a slot 164 in the operator arm 149 and threaded within the lever arm 144.

It may be seen from the foregoing that an improved apparatus has been provided for loading hinged cover cartons with cookies in rows, in which the cartons are successively supplied to a drop chute for loading and are retained in position on a traveling conveyor by the stop 13, retractible upon loading of the cartons, and retaining the carton in position with its cover extending along the outside of the forward wall of the drop chute out of interfering relation with the dropping of cookies in the carton.

It may further be seen that rows of cookies are dropped to pass through the drop chute to be loaded in the carton 23 in timed relation with respect to the supply of cartons beneath the drop chute and that the mechanism for moving the drop gates into cookie dropping positions also serves to pivot the dust flaps on opposite ends of the cartons out of the paths of the dropping rows of cookies.

While I have herein shown and described one form in which the invention may be embodied, it may readily be understood that various variations and modifications in the invention may be attained without departing from the spirit and scope of the novel concepts thereof.

I claim as my invention:

1. In apparatus of the class described,
   a transfer table,
   a carton delivery conveyor at one side of said transfer table and travelling at generally right angles with respect thereto,
   a pusher successively pushing cartons along said transfer table onto said conveyor,
   said pusher including a pusher member and a stop member in advance of said pusher member and movable with said pusher along the leading side of a carton as it is discharged onto said conveyor and retaining the carton in position for loading and releasing the loaded carton for closing.

2. In an apparatus of the class described,
   a carton delivery conveyor,
   a transfer table to one side of said conveyor and extending over said conveyor for a portion of the width thereof,
   a carton guide extending along said transfer table.
   a pusher disposed rearwardly of said guide for successively pushing cartons along said transfer table onto said conveyor,
   a stop on the opposite side of said carton guide from said pusher and extending along said guide over said conveyor and movable with said pusher,
   and power means reciprocably moving said pusher and stop to move said stop beyond the end of said carton guide over said conveyor and engage the leading edge of a carton deposited on said conveyor and hold the carton for loading, and releasing the carton for closing upon return movement of said pusher and stop.

3. In an apparatus of the class described, a continuously driven carton delivery conveyor, a transfer table extending transversely of said conveyor and having a discharge end in carton delivery relation with respect to said conveyor, a retaining guide extending along the forward end of said transfer table for retaining a series of cartons in aligned relation with respect to each other on said transfer table, a pusher guided for reciprocal movement along said transfer table for successively supplying cartons to said conveyor, and a stop connected with said pusher and extending in advance of said pusher and movable with said pusher over said conveyor for retaining the successive cartons from movement with said conveyor for loading and successively releasing the cartons when loaded for closing.

4. In an apparatus of the class described, a transfer table having a carton guide extending along one side thereof, a carton delivery conveyor extending transversely of said transfer table in carton receiving relation with respect thereto, a carton supply conveyor delivering empty cartons to said transfer table and maintaining a supply of cartons along said guide, a pusher on one side of said guide guided for reciprocal movement along said guide and transfer table for successively supplying cartons to said delivery table for loading, and a carton retainer connected with said pusher and movable therewith beyond the discharge end of said guide for retaining cartons in position for loading and releasing loaded cartons for closing.

5. In an apparatus of the class described, a delivery conveyor, a transfer table extending transversely of said delivery table over the top thereof in carton delivery relation with respect thereto, a carton guide extending along the front side of said transfer table, a supply conveyor supplying empty cartons to said transfer table to be retained thereto by said guide, a parallel guide spaced rearwardly of said front guide and maintaining the cartons in aligned relation for discharge onto said carton delivery conveyor, a pusher guided for movement along said transfer table to successively deliver cartons on said carton delivery conveyor, means supporting and guiding said pusher for movement along said transfer table including a bar disposed forwardly of said front guide and extending parallel thereto and guided for reciprocable movement along said front guide, a supporting connection between said bar and said pusher, said bar extending toward the delivery end of said front guide and having a carton stop on the end thereof movable along said guide and beyond the discharge end thereof for retaining a carton in position on said carton delivery conveyor for loading, and power means connected with said bar for successively moving said pusher and stop along said transfer table to successively transfer cartons to said delivery table for loading and retain cartons thereon during the loading thereof and then release the cartons for closing at the termination of a loading operation.

6. In an apparatus of the class described, a carton delivery conveyor, a transfer table extending transversely of said delivery conveyor and over the top thereof in carton discharge relation with respect thereto, a carton retainer guide extending along the front side of said transfer table, a supply conveyor extending parallel to said carton delivery conveyor and supplying empty cartons to said transfer table to be retained thereto by said retainer guide, a pusher disposed rearwardly of said retainer guide for movement along said guide, means supporting and guiding said pusher for movement along said transfer table and guide including a bar disposed forwardly of said retainer guide, means supporting said bar above said transfer table for movement parallel to said retainer guide, a supporting connection from said bar to said pusher, power means operatively connected with said bar for reciprocably driving said bar and pusher, and a stop on the advance end of said bar adjacent said conveyor for movement beyond the end of said retainer guide retaining a carton from movement along said conveyor when discharged onto said conveyor and in position for loading, and releasing the carton to be carried by said conveyor for closing upon return movement of said pusher and bar.

7. An apparatus in accordance with claim 6 wherein the means for reciprocably moving said pusher and bar comprises a rotatably driven crank, a lever arm pivoted intermediate its ends, a link connecting said crank to said lever arm for rocking said lever arm and a linkage connection from said lever arm to said bar for reciprocably moving said bar stroke lengths sufficient to supply a carton for loading for each forward stroke of said bar and to release a carton for closing upon each return stroke of said bar.

8. In an apparatus for loading cookies into cartons having hinged covers and opposite hinged dust flaps, a carton delivery conveyor, a drop chute extending transversely of said conveyor and disposed thereabove for guiding rows of cookies into cartons on said conveyors, a transfer conveyor disposed above said drop chute and extending transversely of said delivery conveyor, a drop gate disposed above said drop chute and forming the material carrying surface of said transfer conveyor and movable to release cookies to drop downwardly into said drop chute in rows, pusher means movable transversely of said delivery conveyor for supplying cartons in cookie receiving relation with respect to said drop chute, stop means movable with said pusher means transversely of said conveyor along the forward side of said drop chute and retaining a carton from movement along said conveyor upon the advance of a carton to said drop chute and releasing a loaded carton to be delivered by said conveyor for closing, and guide means extending from said drop chute towards said pusher means, guiding the hinged covers to pass along the outside of said drop chute during a carton loading operation.

9. In an apparatus for loading cookies into cartons having hinged covers and opposite hinged dust flaps, a delivery conveyor, a drop chute disposed transversely of said delivery conveyor and supported above said delivery conveyor to accommodate an empty carton to be moved thereunder, a transfer conveyor disposed above said drop chute and movable transversely of said carton delivery conveyor, a drop gate disposed above said drop chute and forming the material carrying surface of said transfer conveyor and mounted for release movement to release the cookies to drop downwardly into said drop chute in rows, a transfer plate extending transversely of said delivery conveyor in alignment with said drop chute, carton guide means extending along said transfer plate for guiding cartons to said drop chute, pusher means reciprocably movable along said transfer plate for supplying cartons to said drop chute and including stop means forming a support for said pusher means and supported for movement along said transfer plate forwardly of said guide means and moving with said pusher over said delivery conveyor upon the pushing of a carton onto said delivery conveyor into cookie receiving relation with respect to said drop chute and maintaining the carton in position beneath said drop chute for the loading of cookies thereinto during continuous travel of said carton delivery conveyor.

10. A cookie loading apparatus in accordance with claim 9 wherein the drop chute has a front wall, a rear wall spaced rearwardly therefrom and opposite end walls, wherein a stop depends from the end wall most remote from said pusher and limits carton travel beneath said drop chute, and wherein said stop is spaced forwardly of said front wall a distance sufficient to accommodate the carton cover to move along the outside of said front wall upon movement of said stop inwardly along said conveyor, to accommodate said stop to hold the carton cover free from the discharge end of said drop chute.

11. An apparatus in accordance with claim 10 wherein moveable dust flap retainers are movably mounted beneath said end walls and extend therealong and wherein means operated in timed relation with movement of said drop gate are provided to move said dust flap retainers to come into engagement with the insides of said dust flaps and hold said flaps clear of the open bottom of said drop chute during a carton loading operation.

12. In an apparatus for loading cookies into cartons having hinged covers and opposite dust flaps, a delivery conveyor, a transfer conveyor disposed above said delivery conveyor and extending transversely thereof for transferring groups of cookies for loading, a drop chute in cookie receiving relation with respect to said transfer conveyor, and disposed above said delivery conveyor, a drop gate disposed above said drop chute and forming the material carrying surface of said transfer conveyor, pusher means movable transversely of said delivery conveyor for supplying cartons to said drop chute for loading, stop means movable with said pusher means in advance thereof for retaining cartons beneath said drop chute, said stop means being spaced in advance of said drop chute a distance sufficient to accommodate the hinged cover to move along the outside of said drop chute, a drop gate forming the material carrying surface of said transfer conveyor and movable transversely to release the cookies to drop into said drop chute, said drop chute having flap retainers pivoted to opposite sides thereof for movement about axes parallel to the direction of travel of said delivery conveyor into engagement with the insides of the carton flaps to hold the carton flaps in outwardly spaced relation with respect to the carton to accommodate free loading thereof, means for reciprocably driving said pusher to supply cookies to said drop chute, and means operated in timed relation with respect to operation of said pusher for moving said drop gate laterally and for operating said flap retainers to come into retaining engagement with the carton flaps upon the dropping of cookies into the carton.

13. In an apparatus for loading cookies into cartons having hinged covers and opposite dust flaps, a carton supply conveyor, a transfer table at the discharge end thereof and extending transversely therefrom, a delivery conveyor movable in the direction of travel of said carton supply conveyor and having said transfer plate extending thereover for a portion of the width thereof, a transfer conveyor disposed above said delivery conveyor and transferring groups of cookies for loading, a drop chute between said transfer conveyor and said delivery conveyor in cookie receiving relation with respect to said transfer conveyor, a drop gate disposed above said drop chute and forming the material carrying surface of said transfer conveyor, means for moving said drop gate laterally to drop a row of cookies into said drop chute, a pusher guided for reciprocable movement along said transfer plate toward and from said delivery conveyor for supplying cartons to said drop chute, stop means guided for movement along said transfer plate with said pusher means and extending in advance of said pusher means to retain cartons beneath said drop chute for loading and spaced a sufficient distance in advance of said drop chute to accommodate the hinged cover of the carton to extend along the outer side of said drop chute during loading of the carton, guide means extending from said drop chute for guiding the hinged covers to pass along the outside of said drop chute, means reciprocably driving said stop means and said pusher means, for supplying cartons to said drop chute and retaining cartons thereto for loading, and means operated in timed relation with respect to operation of said pusher and said drop gate for engaging the insides of the carton flaps and retaining the carton flaps free from the dropping cookies during the loading operation comprising, rock shafts pivotally mounted on opposite sides of said drop chute and extending in the direction of travel of the delivery conveyor, a flap retainer on each rock shaft, movable upon movement of said rock shaft into engagement with the inside of a carton flap and moving the carton flaps outwardly with respect to the carton, and a crank and linkage connection between said means for moving said drop gate laterally and said rock shafts for rocking said rock shafts to retain the flaps out of the line of delivery of cookies during movement of said drop gates to cookie dropping positions.

14. An apparatus for loading cookies into cartons having hinged covers and opposite dust flaps, a carton supply conveyor, a transfer table at the discharge end thereof extending transversely of said supply conveyor, a guide extending along said plate for retaining cartons delivered thereto by said conveyor, a delivery conveyor disposed to one side of said carton supply conveyor, said transfer table extending over said delivery conveyor for a portion of the width thereof in a plane parallel to the plane of travel of said delivery conveyor, a transfer conveyor disposed above said delivery conveyor and extending transversely thereof and transferring groups of cookies for loading, a drop gate forming the material carrying surface of said transfer conveyor, a cam shaft, a cam on said shaft, and a linkage and leverage connection from said cam to said drop gate for periodically moving said drop gate to accommodate the discharge of cookies from said conveyor, a drop chute in cookie receiving relation with respect to said transfer conveyor and in cookie discharge relation with respect to said delivery conveyor, pusher means disposed on the inside of said guide and guided for movement along said guide for supplying cartons to said drop chute for loading, stop means on the opposite side of said guide from said pusher means and extending in advance thereof and connected with said pusher means for movement therewith to retain cartons discharged onto said delivery conveyor in cookie loading relation with respect to said drop chute, with the covers thereof extending upwardly along the outside of said drop chute, a crank rotatably driven from said cam shaft, a linkage and leverage connection from said crank to said pusher means and said stop means, for reciprocably moving said pusher means and stop means toward and from said delivery conveyor to supply cartons to said drop chute and retain cartons thereto during a loading operation, and means operated by said cam in timed relation with respect to movement of said drop gate to one side of said transfer conveyor, to effect the discharge of cookies therefrom into said drop chute, for simultaneously engaging the insides of the carton dust flaps and moving the dust flaps outwardly during a carton discharge operation.

15. An apparatus for loading cookies in accordance with claim 14 wherein the means for retaining the carton dust flaps out of the path of the dropping cookies comprises a pair of rockable dust flap retainers rockingly mounted on opposite ends of said drop chute for movement about axes parallel to the direction of travel of said delivery conveyor from positions out of range of the carton, downwardly into engagement with the insides of the carton dust flaps, upon movement of said drop gate to a carton discharge position, and wherein a crank and linkage connection is provided between said cam moving said drop gate into dropping position and said dust flap retainers.

16. In an apparatus for loading cookies and the like, a delivery conveyor delivering loaded cartons for closing, a transfer conveyor spaced above said delivery conveyor and extending transversely thereof, a drop gate forming the material carrying surface of said transfer conveyor, a drop chute in cookie receiving relation with respect to said drop gate and in cookie discharge relation with respect to said delivery conveyor, a crank arm, means rockably moving said crank arm in timed relation with respect to travel of said delivery conveyor, a link and leverage connection from said crank arm to said drop gate for moving said drop gate laterally to effect discharge of cookies from said transfer conveyor into said drop chute, said drop chute having flap retainers pivotally mounted on opposite sides thereof for movement from elevated positions downwardly into engagement with the insides of the cartion flaps, to retain the carton flaps out of the paths of the dropping cookies during a carton loading operation, and a drive connection from said crank arm to said flap retainers for moving said flap retainers into flap retaining positions upon movement of said drop gate to effect the discharge of cookies through said drop chute.

17. An apparatus for loading cookies in accordance with claim 16 wherein the drive connection from the crank arm moving the drop gate into and out of carton supporting positions comprises a rod extending transversely of the delivery conveyor and spaced rearwardly of the drop chute, a swingable support for said rod, an operative connection from said crank arm to said swingable support for reciprocably moving said rod toward and from said drop chute upon reciprocable movement of said drop gate, a lever arm pivotally supported on said drop chute in rearwardly spaced relation with respect thereto for movement about an axis extending transversely of the delivery conveyor, yieldable means maintaining said lever arm in engagement with said rod, cranks on the rear ends of said flap retainers, a transverse drive member having opposite slotted ends having slidable engaging connection with said cranks, and lever means rocked by rockable movement of said lever arm and having operative connection with said transverse drive arm.

18. In an apparatus for loading cookies into cartons having hinged covers, a carton delivery conveyor, means for loading cookies into cartons on said conveyor including
a drop chute extending transversely of said conveyor, means for supplying cartons to said drop chute including
a transfer table extending over said conveyor,
pusher means movable along said transfer table, for pushing cartons to said drop chute,
a supply conveyor supplying cartons to said transfer table,
a guide extending along the opposite side of said transfer table from said supply conveyor, stop means movable along said guide in advance of said pusher means and beyond the end of said table along said drop chute, means for moving said pusher and stop towards and from said drop chute in timed relation with respect to the dropping of cookies through said chute, and guide means extending from said drop chute and along said guide and engaging the leading ends of the hinged covers and guiding the hinged covers to pass along the outside of said drop chute during a cookie loading operation.

19. An apparatus in accordance with claim 18 wherein the guide means includes
a guide plate flaring at the entering end of the guide,
and a downwardly opening channel extending along the top of said guide plate to said drop chute and extending from said guide plate in the direction of travel of the delivery conveyor.

No references cited.

TRAVIS S. McGEHEE, *Primary Examiner.*